United States Patent
Kim et al.

(10) Patent No.: US 9,508,187 B2
(45) Date of Patent: Nov. 29, 2016

(54) MEDICAL IMAGING APPARATUS AND CONTROL METHOD FOR THE SAME

(71) Applicant: SAMSUNG MEDISON CO., LTD., Gangwon-do (KR)

(72) Inventors: Han Jun Kim, Seoul (KR); Sung Yoon Kim, Namyangju-si (KR); Jun Sang Yoo, Suwon-si (KR); Jun Kyo Lee, Seoul (KR)

(73) Assignee: SAMSUNG MEDISON CO., LTD., Hongcheon-gun, Gangwon-do (KR)

( * ) Notice: Subject to any disclaimer, the term of this patent is extended or adjusted under 35 U.S.C. 154(b) by 234 days.

(21) Appl. No.: 14/149,711

(22) Filed: Jan. 7, 2014

(65) Prior Publication Data

US 2014/0327667 A1  Nov. 6, 2014

(30) Foreign Application Priority Data

May 2, 2013  (KR) .......................... 10-2013-0049476

(51) Int. Cl.
*G06T 15/08* (2011.01)
*G06T 19/00* (2011.01)

(52) U.S. Cl.
CPC .............. *G06T 15/08* (2013.01); *G06T 19/00* (2013.01); *G06T 2210/41* (2013.01)

(58) Field of Classification Search
CPC .................. G06T 7/0081; G06T 2207/10028; G06T 7/0097; G06T 2207/10072; G06T 2207/30096; G06T 19/003; G06T 2219/028; G06T 2210/41; G06T 19/00; G06T 7/0012; G06T 2207/10132; G06T 2207/30101; G06T 2207/30172; G06T 2219/008; A61B 1/2676; A61B 2019/5483; A61B 5/064; A61B 5/1127; A61B 8/483; A61B 8/469; A61B 8/463

See application file for complete search history.

(56) References Cited

U.S. PATENT DOCUMENTS 6,674,430 B1 *  1/2004  Kaufman .............. G06T 15/005
                                                        345/419
8,509,511 B2 *  8/2013  Sakaguchi ............... A61B 6/12
                                                        382/131

(Continued)

FOREIGN PATENT DOCUMENTS

JP         2004-073697 A    3/2004
JP         2004-141522 A    5/2004

(Continued)

OTHER PUBLICATIONS

Korean Notice of Allowance issued in Korean Application No. 10-2013-0049476 dated Aug. 22, 2014, with English Translation.
Julian Guerrero et al., "Real-Time Vessel Segmentation and Tracking for Ultrasound Imaging Applications", IEEE Transactions on Medical Imaging, vol. 36, No. 8, Aug. 2007.

(Continued)

*Primary Examiner* — Haixia Du
(74) *Attorney, Agent, or Firm* — McDermott Will & Emery LLP

(57) ABSTRACT

Disclosed herein is a medical imaging apparatus including a volume data generation unit to generate volume data of an object containing a target site to be inspected, a position calculation unit to detect the target site from the volume data of the object and to calculate a center of the target site, a marker data generation unit to generate marker data, wherein the marker data are volume data of a volume marker located at a position corresponding to the center of the target site, and a synthesized data generation unit to generate synthesized data by synthesizing the volume data of the object and the marker data.

According to the medical imaging apparatus and a control method therefor, depth or direction information regarding the target site inside the object may be acquired during volume navigation, and thus, a stereoscopic structure of the target site may be identified.

18 Claims, 14 Drawing Sheets

(56) References Cited

U.S. PATENT DOCUMENTS

| | | | |
|---|---|---|---|
| 8,649,584 | B2 | 2/2014 | Kawasaki |
| 2004/0210392 | A1* | 10/2004 | Fleury .................... G01V 11/00 702/6 |
| 2006/0229513 | A1 | 10/2006 | Wakai |
| 2009/0030314 | A1 | 1/2009 | Kawae |
| 2011/0261072 | A1 | 10/2011 | Kadomura et al. |
| 2012/0058823 | A1* | 3/2012 | Minato .................... A63F 13/10 463/32 |
| 2012/0099776 | A1 | 4/2012 | Maeda et al. |
| 2012/0287238 | A1 | 11/2012 | Onishi et al. |
| 2012/0314919 | A1* | 12/2012 | Sparks .................. G06F 19/321 382/128 |

FOREIGN PATENT DOCUMENTS

| | | |
|---|---|---|
| JP | 2006-288495 A | 10/2006 |
| JP | 4199625 B2 | 10/2008 |
| JP | 2012-075728 A | 4/2012 |
| JP | 2012-081254 A | 4/2012 |
| JP | 5002344 B2 | 8/2012 |

OTHER PUBLICATIONS

P. Abolmaesumi et al., "Real-Time Extraction of Carotid Artery Contours from Ultrasound Images", Proceeding CBMS '00 Proceedings of the 13th IEEE Symposium on Computer-Based Medical Systems (CBMS'00), IEEE Computer Society Washington, DC, USA © 2000.

Alex S. Jørgensen et al., "Automatic Vessel Tracking and Segmentation Using Epicardial Ultrasound in Bypass Surgery", Computing in Cardiology 2012, vol. 39, pp. 9-12.

J. Stoitsis et al., "Automated detection of the carotid artery wall in B-mode ultrasound images using active contours initialized by the Hough transform", 30th Annual International IEEE EMBS Conference, Vancouver, British, Columbia, Canada, Aug. 20-24, 2008.

Korean Notice of Non-Final Office Action issued in Korean Patent Application No. 10-2013-0049476 dated Apr. 23, 2014, with English Translation.

Extended European Search Report dated Aug. 18, 2015 issued in European Patent Application No. 13199468.3.

"3D TV," http://navercast.naver.com/contents.nhn?rid=122&contents_id=5621, Oct. 28, 2015.

* cited by examiner

MEDICAL IMAGING APPARATUS AND CONTROL METHOD FOR THE SAME

CROSS-REFERENCE TO RELATED APPLICATION(S)

This application claims the benefit of Korean Patent Application No. 2013-0049476, filed on May 2, 2013 in the Korean Intellectual Property Office, the disclosure of which is incorporated herein by reference.

BACKGROUND

1. Field

Embodiments of the present invention relate to a medical imaging apparatus using a volume marker and a control method therefor.

2. Description of the Related Art

Research into medical imaging apparatuses is actively underway due to an increasing interest in health. Examples of medical imaging apparatuses may include an X-ray imaging apparatus, an X-ray fluoroscopy apparatus, a computed tomography (CT) scanner, a magnetic resonance imaging (MRI) apparatus, a positron emission tomography (PET) apparatus, and an ultrasonic diagnostic apparatus.

These medical imaging apparatuses may generate 2D sectional images of an object and 3D volume data based on the 2D sectional images. Volume data enables an inspector to identify structural properties of the interior of the object and thus may be effectively used in the field of diagnosis.

Meanwhile, visualization of 3D volume data of an object on a 2D screen is referred to as volume rendering.

In addition, volume navigation is a process whereby volume rendering is performed while an inspector changes his or her position until reaching a particular location inside an object and results thereof are inspected. Through volume navigation, both 2D sectional images taken by cutting in three directions and a volume-rendered 3D image may be provided for 3D volume data that moves in accordance with the position of an inspector.

SUMMARY

Therefore, it is an aspect of the present invention to provide a medical imaging apparatus using a volume marker and a control method therefor.

Additional aspects of the invention will be set forth in part in the description which follows and, in part, will be obvious from the description, or may be learned by practice of the invention.

In accordance with one aspect of the present invention, a medical imaging apparatus includes a volume data generation unit to generate volume data of an object containing a target site to be inspected, a position calculation unit to detect the target site from the volume data of the object and to calculate a center of the target site, a marker data generation unit to generate marker data, wherein the marker data are volume data of a volume marker located at a position corresponding to the center of the target site, and a synthesized data generation unit to generate synthesized data by synthesizing the volume data of the object and the marker data.

The volume marker may include at least one volume marker.

The volume marker may include a plurality of volume markers, wherein the volume markers have the same volume and shape.

The volume marker may include a plurality of volume markers, wherein the volume markers have different colors.

The medical imaging apparatus may further include an image processor to generate a plurality of sectional images of each of the volume data of the object and the synthesized data and to generate a rendered image of the synthesized data.

The medical imaging apparatus may further include an input unit to input a selection of a reference section from the sectional images of the volume data of the object, the reference section being used in detecting the target site and calculating the center of the target site, the detecting and the calculating being performed by the position calculation unit.

The image processor may generate a plurality of sample sections parallel to the reference section within the volume data of the object, and the position calculation unit may detect the target site from each of the plurality of sample sections and calculates a center of each target site.

The medical imaging apparatus may further include an input unit to input a selection of a volume marker from the generated sectional images or rendered image of the synthesized data.

The image processor may refresh the rendered image of the synthesized data such that the selected volume marker is located at a center of the rendered image.

The image processor may generate a rendered image in which perspective is applied to the volume marker.

The image processor may generate a plurality of projection images through rendering of the synthesized data from a plurality of viewpoints and generate a stereo projection image by composing the projection images.

The medical imaging apparatus may further include a display unit to display the generated images.

The image processor may generate a rendered image of the volume data of the object, and the display unit may display both the generated rendered image of the volume data of the object and the generated rendered image of the synthesized data.

In accordance with another aspect of the present invention, a medical imaging apparatus includes a volume data generation unit to generate volume data of an object containing a target site to be inspected, a position calculation unit to detect the target site from the volume data of the object and to calculate a center of the target site, a marker data generation unit to generate marker data, wherein the marker data are volume data of a volume marker located at a position corresponding to the center of the target site, and an image processor to generate a plurality of sectional images and a rendered image of each of the volume data of the object and the marker data and to generate synthesized images by synthesizing the corresponding images.

In accordance with another aspect of the present invention, a method of controlling a medical imaging apparatus includes generating volume data of an object containing a target site to be inspected, detecting the target site from the volume data of the object and calculating a center of the target site, generating marker data, wherein the marker data are volume data of a volume marker located at a position corresponding to the center of the target site, and generating synthesized data by synthesizing the volume data of the object and the marker data.

The volume marker may include at least one volume marker.

The volume marker may include a plurality of volume markers, wherein the volume markers have the same volume and shape.

The volume marker may include a plurality of volume markers, wherein the volume markers have different colors.

The method may further include generating a plurality of sectional images of the volume data of the object.

The method may further include inputting a selection of a reference section from the sectional images of the volume data of the object, the reference section being used to detect the target site and calculate the center of the target site.

The method may further include generating a plurality of sample sections parallel to the reference section within the volume data of the object, wherein the detecting includes detecting the target site from each of the plurality of sectional images and calculating a center of each target site.

The method may further include generating a plurality of sectional images and a rendered image of the synthesized data.

The method may further include inputting a selection of a volume marker from the generated sectional images or rendered image of the synthesized data.

The method may further include refreshing the rendered image of the synthesized data such that the selected volume marker is located at a center of the rendered image.

The generating of the rendered image of the synthesized data may include generating a rendered image in which perspective is applied to the volume marker.

The generating of the rendered image of the synthesized data may include generating a plurality of projection images through rendering of the synthesized data from a plurality of viewpoints and generating a stereo projection image by composing the projection images.

The method may further include displaying the generated images.

The generating of the rendered image of the synthesized data may include generating a rendered image of each of the volume data of the object and the synthesized data, and the displaying may include displaying both the generated rendered image of the volume data of the object and the generated rendered image of the synthesized data.

In accordance with another aspect of the present invention, a method of controlling a medical imaging apparatus includes generating volume data of an object containing a target site to be inspected, generating a plurality of sectional images of the volume data of the object, detecting the target site from the volume data of the object and calculating a center of the target site, generating marker data, wherein the marker data are volume data of a volume marker located at a position corresponding to the center of the target site, generating a plurality of sectional images of the marker data, generating a rendered image of each of the volume data of the object and the marker data, and generating synthesized images by synthesizing the corresponding images selected from among the sectional images and the rendered image of each of the volume data of the object and the marker data.

According to the medical imaging apparatus and the control method therefor, depth or direction information of the target site inside the object may be acquired while volume navigation is performed, and thus, a stereoscopic structure of the target site may be identified.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
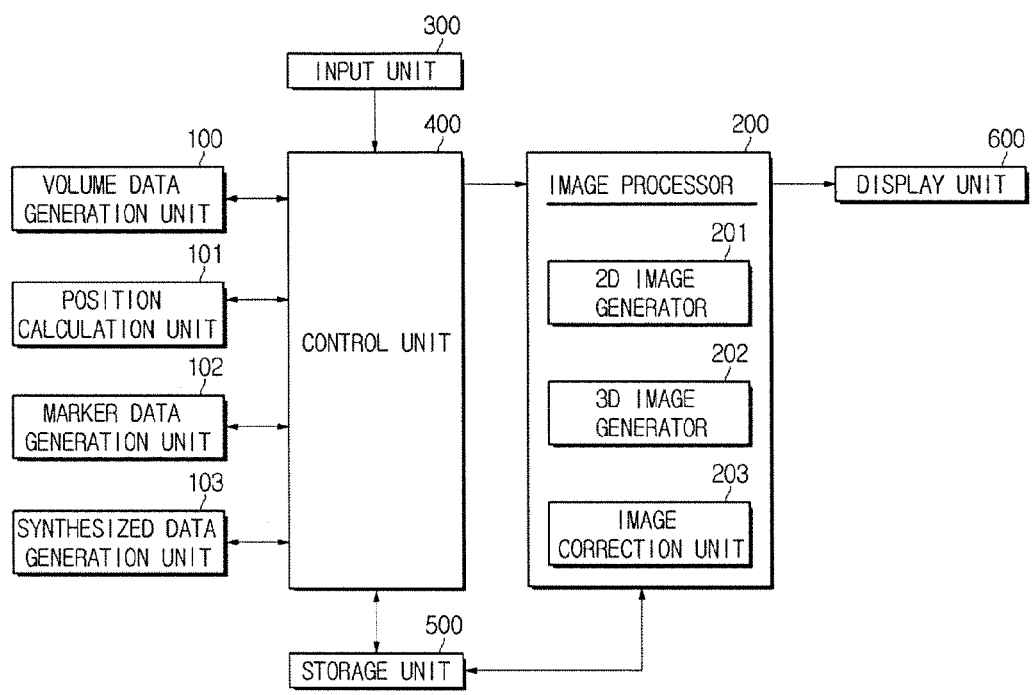
FIG. 1 is a block diagram illustrating a medical imaging apparatus according to an embodiment of the present invention.

Reference will now be made in detail to the embodiments of the present invention, examples of which are illustrated in the accompanying drawings, wherein like reference numerals refer to like elements throughout.

Hereinafter, a medical imaging apparatus and a method of controlling the same, according to embodiments of the present invention, will be described in detail with reference to the accompanying drawings.

FIG. 1 is a block diagram illustrating a medical imaging apparatus according to an embodiment of the present invention.

As illustrated in FIG. 1, the medical imaging apparatus may include a volume data generation unit 100, a position calculation unit 101, a marker data generation unit 102, a synthesized data generation unit 103, an image processor 200, an input unit 300, a control unit 400, a storage unit 500, and a display unit 600.

The volume data generation unit 100 may generate volume data of an object containing a target site to be examined. In this regard, the object may be a living body of a human or an animal, and the target site may be tissue in the living body, such as the liver, blood vessels, bones, muscles, the back, or the like.

The volume data of the object refer to a set of three-dimensional discrete arrays formed by sequentially stacking two-dimensional sectional images acquired through tomography of the object in accordance with position.

Figure 2:
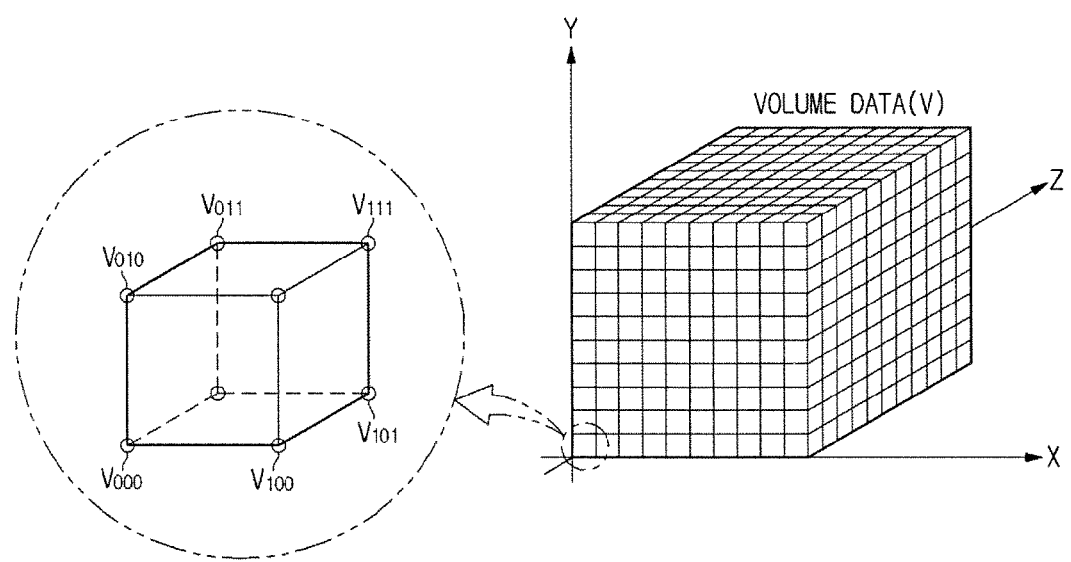
FIG. 2 is a view illustrating volume data.

FIG. 2 is a view illustrating volume data.

Volume data consists of elements referred to as voxels. Thus, assuming that volume data are denoted as a set of voxels V and three-dimensional spatial coordinates for voxels are represented by (x,y,z), the voxels may be represented by Vxyz.

For example, as illustrated in FIG. 2, a voxel having spatial coordinates of (0,0,0) may be represented by $V_{000}$, a voxel having spatial coordinates of (1,0,0) by $V_{100}$, and a voxel having spatial coordinates of (0,1,0) by $V_{010}$.

The volume data generated by the volume data generation unit 100 may be stored in the storage unit 500.

The position calculation unit 101 may, first, detect the target site inside the object.

Figure 3:
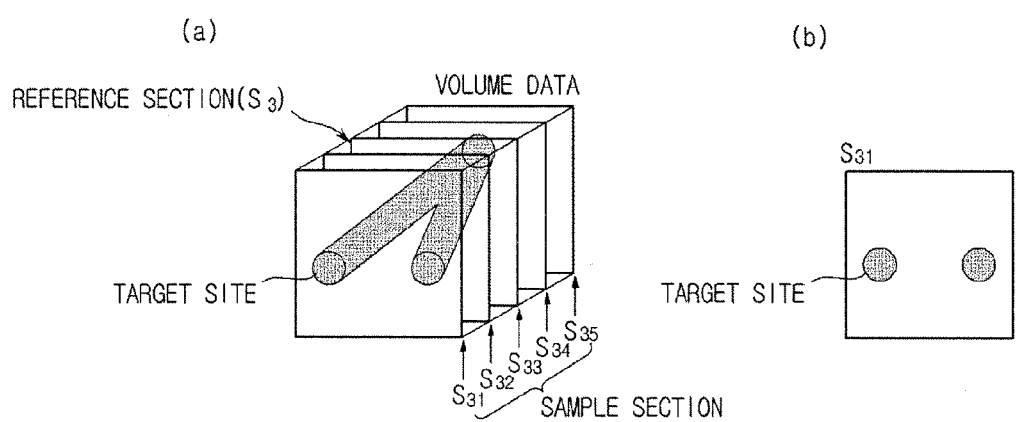
FIG. 3 illustrates a target site detection process.

In particular, a target site detection process will be described with reference to FIG. 3. FIG. 3 illustrates a target site detection process.

A two-dimensional sectional image selected via the input unit 300, which will be described below, is denoted as reference section $S_3$. A plurality of sample sections $S_{31}$, $S_{32}$, $S_{33}$, $S_{34}$ and $S_{35}$ are determined to be parallel to the reference section $S_3$ within the volume data of the object. A target site contained in the sample section $S_{31}$ is detected. In addition, a target site for each of the other sample sections is also detected.

Detection of the target site may be performed using a learning-based detection method used to design a classifier, a Hough transformation method in which various candidate circles or ovals are drawn using accumulator volume and a circle or oval having the highest score is determined, a model fitting method using an least-squares error, or the like. However, a detection method of the target site is not limited to the above-described methods, and any other methods known in the art may be used to detect the target site.

The position calculation unit 101 may track the detected target site.

The position calculation unit 101 may reduce misdetection or false detection through a tracking process.

The position calculation unit 101 may calculate a center of the detected target site. In particular, when a target site is detected from each of the sample sections within the volume data of the object, the position calculation unit 101 may calculate a center of the detected target site of each sample section.

A method for calculation of the center of the detected target site is not particularly limited, and methods known in the art may be used.

The marker data generation unit 102 may generate marker data so that volume markers are disposed corresponding to the center of each target site. In this regard, the term "marker data" as used herein refers to volume data of volume markers and thus the marker data form a three-dimensional set of voxels.

Figure 4:
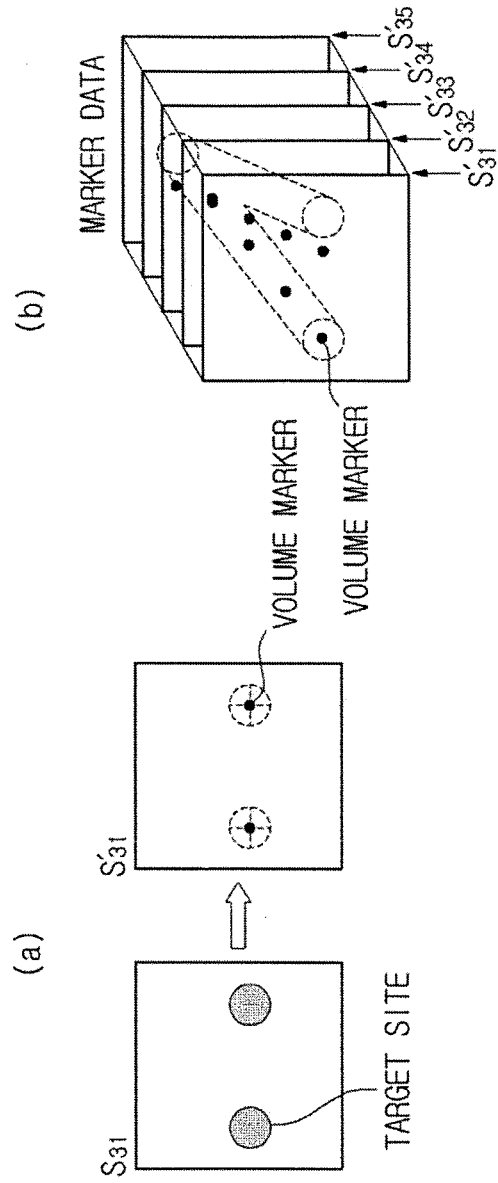
FIG. 4 illustrates a marker data generation process.

FIG. 4 illustrates a marker data generation process.

In the sample sections $S_{31}$, $S_{32}$, $S_{33}$, $S_{34}$ and $S_{35}$ illustrated in FIG. 3, as illustrated in FIG. 4(*a*), volume markers are generated corresponding to centers of respective target sites detected from the sample section $S_{31}$. In addition, volume markers are generated corresponding to centers of respective target sites detected from each of the other sample sections. When the volume markers generated corresponding to each sample section are arranged according to the order of the sample sections $S_{31}$, $S_{32}$, $S_{33}$, $S_{34}$ and $S_{35}$, as illustrated in FIG. 4(*b*), marker data in which a plurality of volume markers are arranged may be generated.

A volume marker, which is a three-dimensional marker, may have volume and any shape. For example, as illustrated in FIG. 4, a volume marker may have a spherical shape.

When a plurality of volume markers is used, the volume markers may have the same volume and shape.

In addition, the plurality of volume markers may have different colors, and an inspector may distinguish the volume markers from one another by the colors.

The marker data generated by the marker data generation unit 102 have the same type as that generated by the volume data generation unit 100.

The marker data generated by the marker data generation unit 102 may be stored in the storage unit 500.

The synthesized data generation unit 103 may match geometric positions of the volume data generated by the volume data generation unit 100 and the marker data generated by the marker data generation unit 102 in a one-to-one manner.

Figure 5:
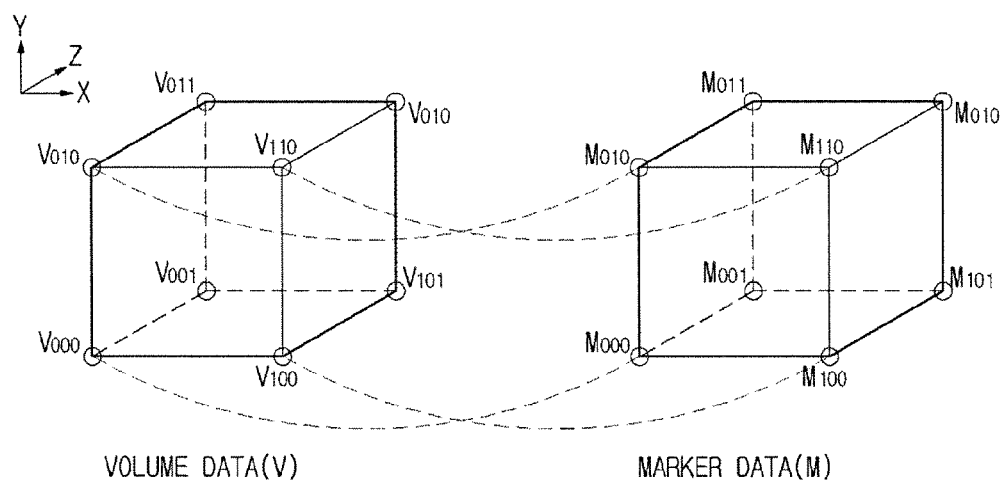
FIG. 5 is a view for explaining a method of matching geometric positions of volume data and marker data of an object in a one-to-one manner.

FIG. 5 is a view for explaining a method of matching geometric positions of volume data and marker data of an object in a one-to-one manner.

Referring to FIG. 5, assuming that volume data generated by the volume data generation unit 100 are V and marker data generated by the marker data generation unit 102 are M, $V_{000}$, $V_{100}$, and $V_{010}$ are matched one-to-one with $M_{000}$, $M_{100}$, and $M_{010}$. In such a manner, geometric positions of the volume data V and the marker data M may be adjusted by matching voxels Vxyz of the volume data V and voxels Mxyz of the marker data M in a one-to-one manner.

The synthesized data generation unit 103 may synthesize the volume data generated by the volume data generation unit 100 and the marker data generated by the marker data generation unit 102.

Figure 6:
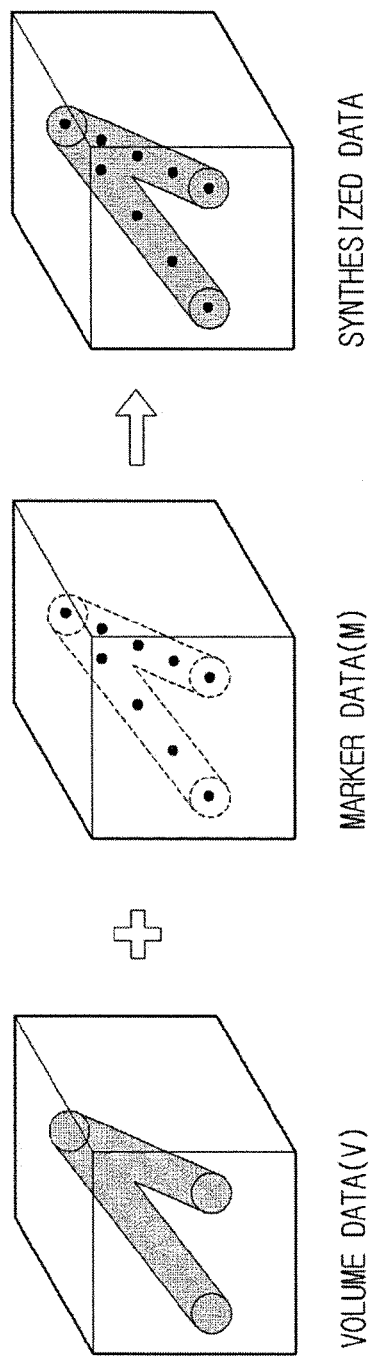
FIG. 6 illustrates a process of generating synthesized data.

FIG. 6 illustrates a process of generating synthesized data.

As illustrated in FIG. 6, from volume data V and marker data M of an object, geometric positions of which are matched one-to-one, synthesized data in which a plurality of volume markers are arranged along a center of a target site may be formed by adding voxel values of the corresponding voxels Vxyz and Mxyz.

The image processor 200 may include a two-dimensional (2D) image generator 201, a three-dimensional (3D) image generator 202, and an image correction unit 203.

The 2D image generator 201 may generate a plurality of sectional images cut in three directions based on the center of volume data of an object. In this regard, the sectional images may be perpendicular to one another.

Figure 7:
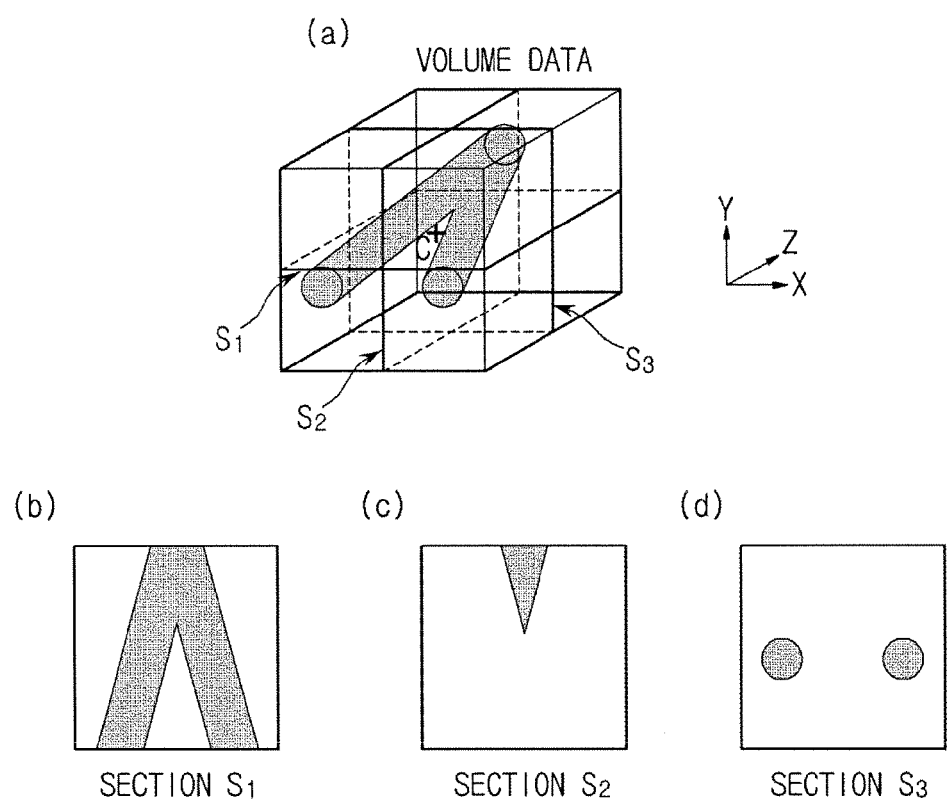
FIG. 7 illustrates a plurality of sectional images cut in three directions based on a center C of volume data of an object.

FIG. 7 illustrates a plurality of sectional images cut in three directions based on a center C of volume data of an object.

As illustrated in FIG. 7(*a*), a sectional image $S_1$ may be generated by cutting parallel to an X-Z plane (a plane defined by X and Z axes) based on the center C of volume data of an object, a sectional image $S_2$ by cutting parallel to a Y-Z plane (a plane defined by Y and Z axes), and a sectional image $S_3$ by cutting parallel to an X-Y plane (a plane defined by X and Y axes). Thus, the sectional images $S_1$, $S_2$ and $S_3$ may be perpendicular to one another.

As illustrated in FIGS. 7(*b*), 7(*c*) and 7(*d*), the sectional images $S_1$, $S_2$ and $S_3$ enable a viewer to observe a target site from various directions.

The 2D image generator 201 may generate a plurality of sample sections within the volume data of the object to be parallel to a reference section selected by an inspector before the position calculation unit 101 detects the target site inside the object and calculates the center thereof.

In this regard, the reference section is one of the sectional images taken by cutting the volume data of the object in three directions, and an inspector may select the reference section via the input unit 300, which will be described below.

The 2D image generator 201 may generate, from the synthesized data including the volume data, a plurality of sectional images taken by cutting in three directions based on a center of the synthesized data.

In this regard, the three directions are the same as the above-described directions in which the volume data of the object is sliced. Thus, the sectional images taken by cutting based on the center of the volume data of the object and the sectional images taken by cutting based on the center of the synthesized data are the same, excluding whether or not to include a volume marker.

The 2D image generator 201 may refresh the existing sectional images of the synthesized data by slicing the synthesized data in three directions based on a volume marker selected via the input unit 300, which will be described below. In this regard, the three directions are the same as the existing directions in which the synthesized data are sliced.

The 3D image generator 202 may generate a projection image through volume rendering based on the volume data generated by the volume data generation unit 100 or the synthesized data generated by the synthesized data generation unit 103.

In this regard, the projection image refers to an image acquired through volume rendering based on a single viewpoint of an inspector.

A method of performing volume rendering is not limited. For example, a perspective projection method, which is one of the ray-casting methods, may be considered.

Figure 8:
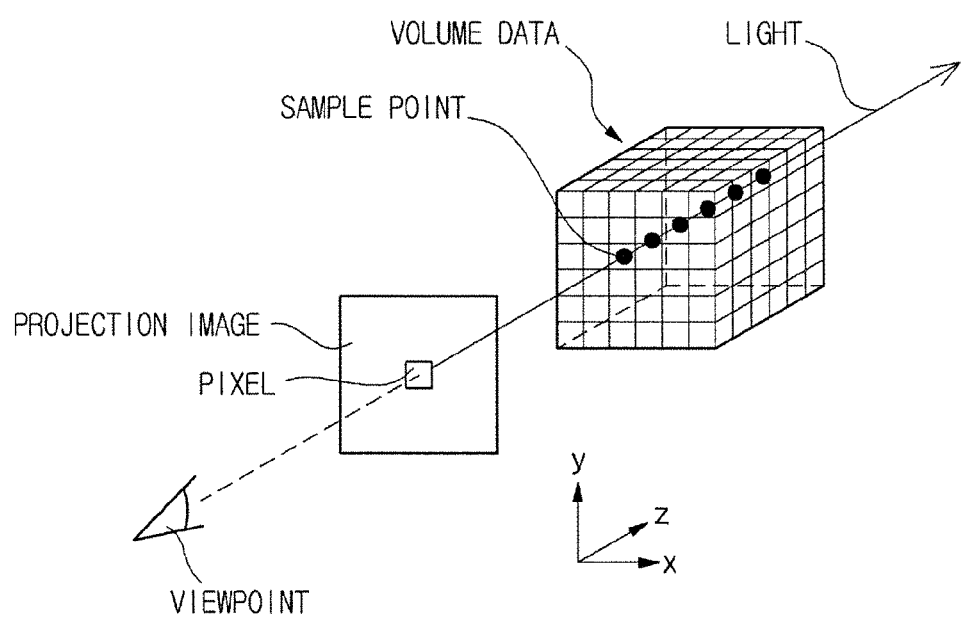
FIG. 8 is a view for explaining a ray-casting method.

FIG. 8 is a view for explaining the ray-casting method.

Referring to FIG. 8, one of a plurality of pixels of the projection image emits virtual rectilinear light in a direction parallel to an inspector viewing direction, and sample points are determined at an intersection point of the virtual rectilinear light and 3D volume data.

Color and opacity of the pixel that emits the virtual rectilinear light are determined by calculating color and opacity of the sample points and accumulating the calculated color and opacity of the sample points. In addition, an average or weighted average of color and opacity values of the sample points may be determined as color and opacity values of the corresponding pixel.

This process is repeated to fill all the pixels of the image, thereby generating the projection image.

Figure 9:
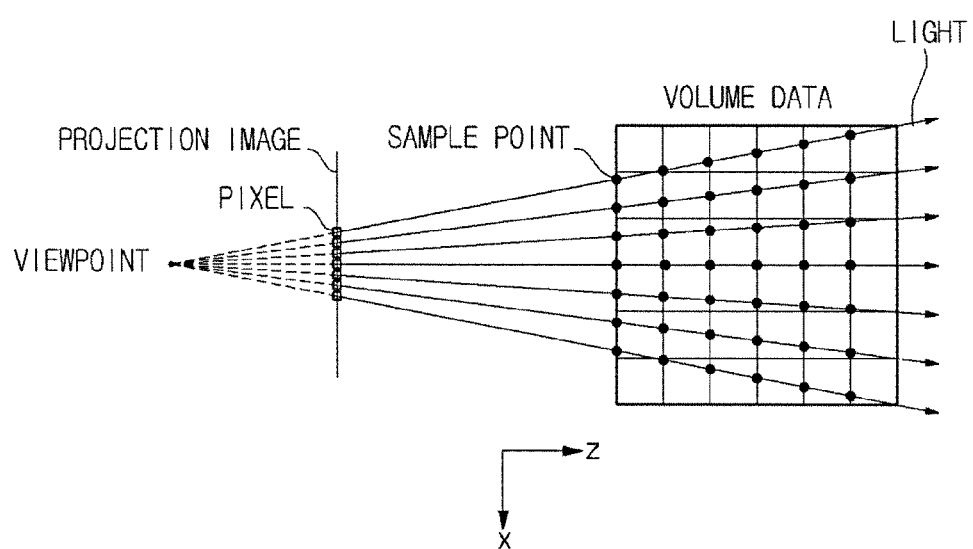
FIG. 9 is a view for explaining a perspective projection method.

FIG. 9 is a view for explaining the perspective projection method. In FIG. 9, the volume data illustrated in FIG. 8 are viewed from a direction parallel to the X-Z plane (a plane defined by X and Z axes).

Perspective projection, which is one of the ray-casting methods, is a method whereby, as described above, color and opacity values of the corresponding pixel are determined using the sample points on the virtual rectilinear light. However, the ray-casting method illustrated in FIG. 8 and the perspective projection method illustrated in FIG. 9 are different in terms of a method of emitting virtual rectilinear light. As illustrated in FIG. 9, pixels of an image emit light at different angles such that light is radiated based on the viewpoint of the inspector. Due to light emitted at different angles, the density of the sample points decreases as the sample points are distant from the viewpoint of the inspector. That is, as the sample points are distant from the viewpoint of the inspector, an interval between the sample points arranged in an X-axis direction increases.

Thus, when volume rendering is performed on the volume data of the object by perspective projection, portions that are distant from the target site may be represented smaller in the projection image. That is, a projection image in which perspective is applied to the target site may be generated.

Similarly, when volume rendering is performed on the synthesized data by perspective projection, a projection image in which perspective is applied to both the target site and a volume marker located at a center thereof may be generated. Therefore, it is easy for an inspector to identify depth information of the center of the target site and a stereoscopic structure of the target site.

The 3D image generator 202 may generate a stereo projection image through volume rendering based on the volume data generated by the volume data generation unit 101 or the synthesized data generated by the synthesized data generation unit 103.

In this regard, the stereo projection image refers to an image acquired by composing a left-side projection image and a right-side projection image acquired through volume rendering in two viewpoints that respectively correspond to left and right eyes of an inspector.

Figure 10:
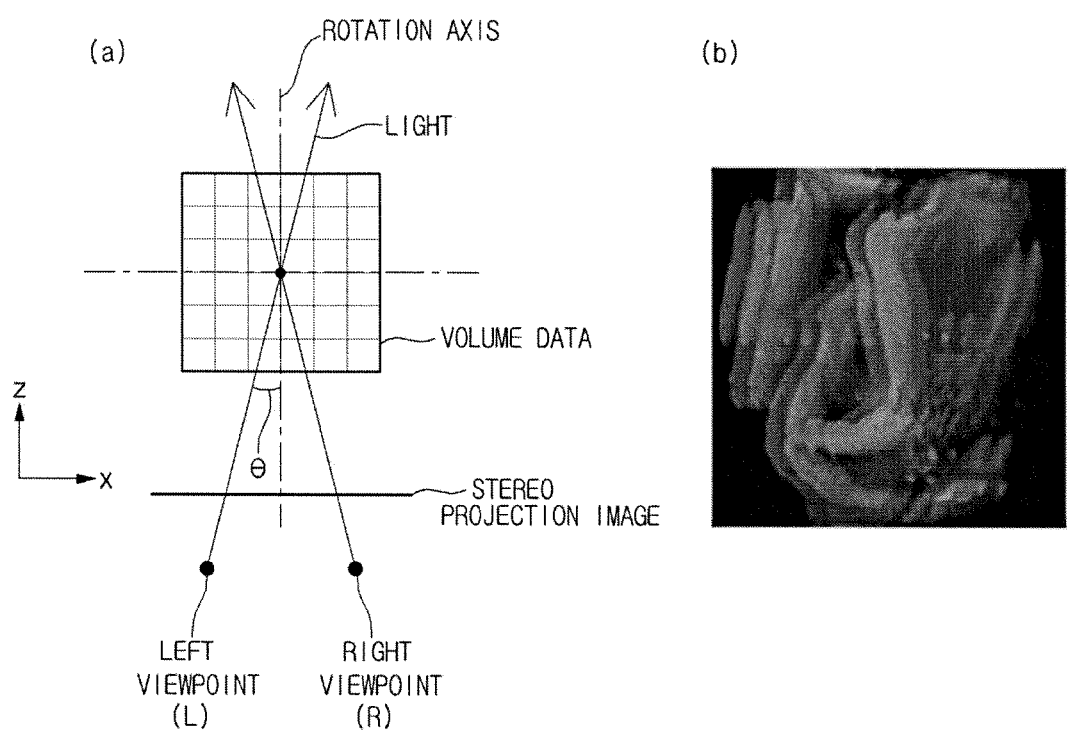
FIG. 10 illustrates a method of acquiring a stereo projection image.

FIG. 10 illustrates a method of acquiring the stereo projection image.

As illustrated in FIG. 10(*a*), a rotation axis is set in a Z axis direction about the center of the volume data, and a left viewpoint L corresponding to the left eye of an inspector is determined. A right viewpoint R corresponding to the right eye of the inspector is determined at a location that is symmetric to the left viewpoint L based on the rotation axis. That is, assuming that the left viewpoint L has an angle of θ with respect to the rotation axis in a left direction, the right viewpoint R is determined at a symmetric location which has an angle of θ with respect to the rotation axis in a right direction. A left-side projection image is generated through volume rendering of volume data at the left viewpoint L, and a right-side projection image is generated through volume rendering of volume data at the right viewpoint R. A stereo projection image as illustrated in FIG. 10(*b*) may be acquired by composing the two projection images.

When a stereo projection image of the synthesized data is acquired using such method, both the target site and a volume marker located at a center thereof are stereoscopically expressed and thus it is easy for an inspector to identify depth or direction information of the target site and a stereoscopic structure of the target site.

The rotation angles of the left viewpoint L and the right viewpoint R about the rotation axis are determined according to interval between the eyes of the inspector and may be input via the input unit 300.

In the following description, a volume-rendered image may be a projection image or a stereo projection image.

The 3D image generator 202 may refresh the existing volume-rendered image of the synthesized data such that a volume marker selected via the input unit 300 is located at a center of the volume-rendered image of the synthesized data. In addition, the volume-rendered image of the synthesized data may be refreshed using known methods, such as a method of using a world matrix or camera matrix.

The image correction unit 203 may correct luminance, contrast, color, size, direction, or the like of images generated by the 2D image generator 201 and the 3D image generator 202.

The image correction unit 203 may transmit the resultant corrected images to the display unit 500 connected to the image processor 200 via a wired or wireless communication network. Accordingly, an inspector may check the resultant corrected image of the object.

The input unit 300 is used to input commands related to operations of the medical imaging apparatus.

In one embodiment, the input unit 300 may be used to input a command for initiation of diagnosis of the object.

In another embodiment, the input unit 300 may be used for an inspector to select a reference section from the sectional images generated by the 2D image generator 201 by slicing the volume data of the object in three directions, wherein the reference section is used to detect the target site and calculate a center thereof.

In another embodiment, the input unit 300 may be used for an inspector to select whether to generate a stereo production image or a rotation angle for generation of the stereo projection image.

In addition, when the volume-rendered image generated by the 3D image generator 202 is displayed on the display unit 600, the input unit 300 may be used for an inspector to select whether to display only the volume-rendered image of the synthesized data or whether to display together with the volume-rendered image of the volume data of the object. In this regard, the volume-rendered image may be a projection image or a stereo projection image.

In this regard, the input unit 300 may be used for an inspector to select a screen display mode. Examples of display modes of an image on a screen include, but are not limited to, an A-mode in which the intensity of an echo signal is represented by the intensity of amplitude, a B-mode represented by converted brightness or luminance, an M-mode in which a distance between the medical imaging apparatus and a moving target site is represented by temporal changes, a D-mode using pulse waves or continuous waves, and a CFM-mode represented as a color image using the Doppler effect.

The input unit 300 may be used for an inspector to select a volume marker to be located at the center of the volume-rendered image of the synthesized data within the sectional images or volume-rendered image of the synthesized data.

Commands input via the input unit 300 may be transmitted to the control unit 400 through wired or wireless communication.

Upon receiving a command to initiate diagnosis of the object via the input unit 300, the control unit 400 may output a control command signal for generation of volume data of the object to the volume data generation unit 100.

The control unit 400 may respectively output control command signals to the 2D image generator 201 and the 3D image generator 202 so that 2D sectional images and a 3D rendered image are generated based on the volume data of the object and the synthesized data.

For example, upon receiving, via the input unit 300, a selection of a reference section from the sectional images taken by slicing the volume data of the object in three directions, the control unit 400 may output a control command signal to the 2D image generator 201 so as to generate a plurality of sample sections parallel to the reference section.

When the 2D image generator 201 generates the sample sections, the control unit 400 may detect the target site from each sample section and output a control command signal to the position calculation unit 101 so as to calculate a center of each target site.

The control unit 400 may output a control command signal so as to display images generated by the image processor 200 on the display unit 600. In this regard, the control unit 400 may also output a control command signal for a screen display mode. A display mode that is automatically selected according to location, size, shape or the like of the target site or a display mode selected by an inspector via the input unit 300 may be output as the command signal.

The storage unit 500 may store data or algorithms for manipulation of the medical imaging apparatus.

As one example of data storage, the storage unit 500 may store a plurality of volume data generated by the volume data generation unit 100, marker data generated by the marker data generation unit 101, and synthesized data generated by the synthesized data generation unit 103.

As another example of data storage, the storage unit 500 may store location of the center of the target site that is calculated by the position calculation unit 101.

As another example of data storage, the storage unit 500 may store image data of 2D and 3D images generated by the image processor 200.

As examples of algorithm storage, the storage unit 500 may store an algorithm to generate the sectional images by slicing the volume data of the object and the synthesized data in three directions, an algorithm to generate the sample sections parallel to the reference section, an algorithm to detect the target site and calculate the center thereof, an algorithm to generate the marker data, an algorithm to generate the synthesized data, an algorithm to generate a projection image or stereo projection image of the volume data of the object and the synthesized data, or the like.

The display unit 600 may display the images generated by the image processor 200 on a screen by using a cathode ray tube (CRT), a liquid crystal display (LCD), a light emitting diode (LED), or the like.

Figure 11:
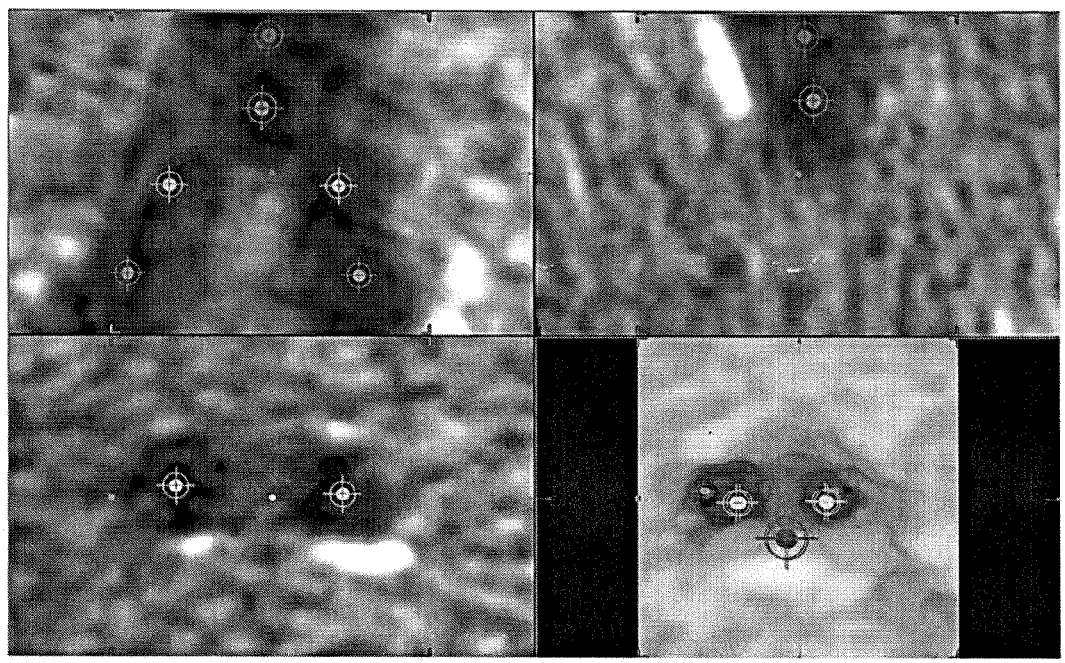
FIG. 11 illustrates output of 2D and 3D images including volume markers.

In particular, this will be described with reference to FIG. 11. FIG. 11 illustrates output of 2D and 3D images including volume markers.

As illustrated in FIG. 11, the display unit 600 may consist of first, second, third and fourth planes. In this regard, an upper left plane is denoted as the first plane, an upper right plane is denoted as the second plane, a lower left plane is denoted as the third plane, and a lower right plane is denoted as the fourth plane.

A plurality of sectional images taken by cutting in three directions based on the center of the synthesized data may be output on the first, second and third planes.

A projection image acquired through volume rendering of the synthesized data may be output on the fourth plane. Unlike illustrated in FIG. 11, a projection image acquired through volume rendering of the volume data of the object, in addition to the projection image may also be output according to selection of an inspector. In addition, unlike illustrated in FIG. 11, a stereo projection image of the synthesized data may also be output according to selection of an inspector. If the stereo projection image is output, an inspector may check the stereo projection image and identify a stereoscopic structure of the target site, with 3D stereoscopic spectacles on.

In addition, as illustrated in FIG. 11 (see the fourth plane), a projection image in which perspective is applied to volume markers may be output according to selection of a volume rendering method by an inspector. Through the projection image, it may be easier for an inspector to identify depth information of the center of the target site and a stereoscopic structure of the target site.

As illustrated in FIG. 11, the volume markers have different colors so that an inspector can distinguish the volume markers from one another by the colors.

An inspector may visually check where volume markers are located in the sectional images or volume-rendered image for the synthesized data via the display unit 600. An inspector may select a volume marker based on the checked locations of volume markers.

The existing sectional images of the synthesized data may be refreshed by slicing the synthesized data in three directions based on the selected volume marker, and the existing volume-rendered image of the synthesized data may be refreshed such that the selected volume marker is located at the center of the volume-rendered image of the synthesized data. Volume navigation may be performed by outputting the refreshed images again to the display unit 600.

Figure 12:
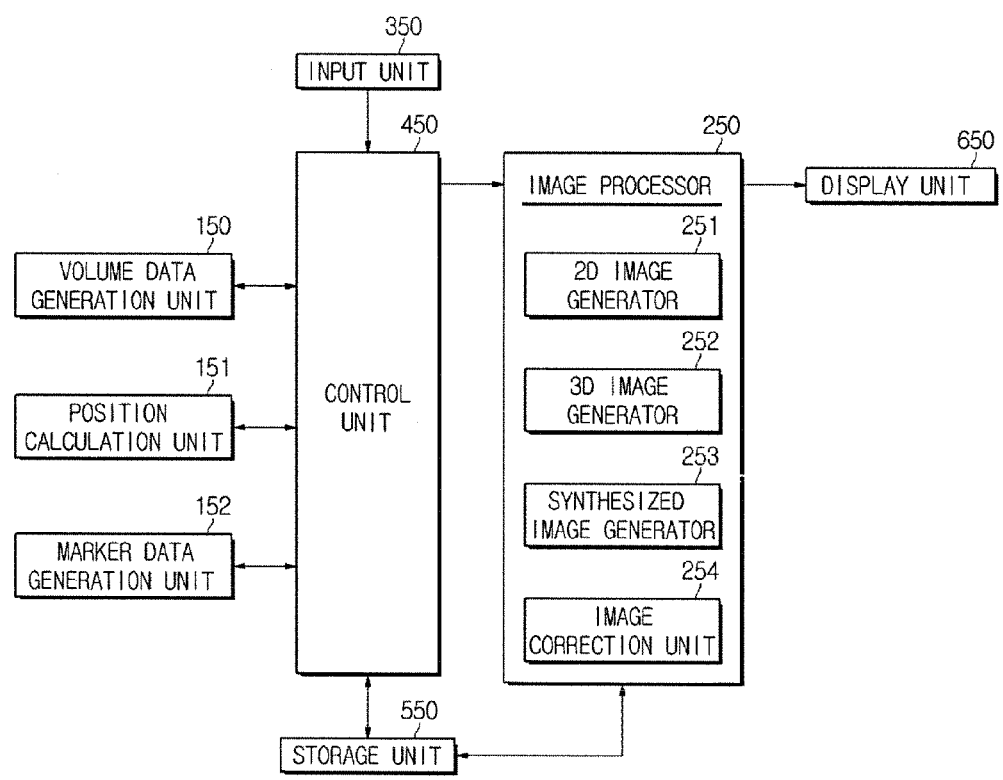
FIG. 12 is a block diagram illustrating a medical imaging apparatus according to another embodiment of the present invention.

FIG. 12 is a block diagram illustrating a medical imaging apparatus according to another embodiment of the present invention.

As illustrated in FIG. 12, the medical imaging apparatus may include a volume data generation unit 150, a position calculation unit 151, a marker data generation unit 152, an image processor 250, an input unit 350, a control unit 450, a storage unit 550, and a display unit 650.

The volume data generation unit 150, the position calculation unit 151, and the marker data generation unit 152 are the same as the volume data generation unit 100, the position calculation unit 101, and the marker data generation unit 102 described above, and thus, a detailed description thereof will be omitted.

In addition, features of the image processor 250, the input unit 350, the control unit 450, the storage unit 550, and the display unit 650 that are the same as those of the image processor 200, the input unit 300, the control unit 400, the storage unit 500, and the display unit 600 will not be described herein.

The image processor 250 may include a 2D image generator 251, a 3D image generator 252, a synthesized image generator 253, and an image correction unit 254.

The 2D image generator 251 may generate, from marker data including volume markers, a plurality of sectional images by slicing the marker data in three directions based on a center of the marker data. In this regard, the three directions are the same as the above-described three directions in which the volume data of the object are sliced.

The 2D image generator 251 may refresh a plurality of existing sectional images for each of volume data and marker data by slicing the volume data and the marker data in three directions based on a volume marker selected via the input unit 350, which will be described below. In this regard, the three directions are the same as the existing directions in which the volume data and the marker data are sliced.

The 3D image generator 252 may perform volume rendering based on volume data generated by the volume data generation unit 150 and marker data generated by the marker data generation unit 152 to generate a projection image of each of the volume data and the marker data.

In this regard, the volume rendering may be performed by perspective projection. Accordingly, a projection image of the volume data of the object in which perspective is applied to a target site to be inspected and a projection image of the marker data in which perspective is applied to volume markers may be generated.

The 3D image generator 252 may perform volume rendering based on volume data generated by the volume data generation unit 150 and marker data generated by the marker data generation unit 152 to generate a stereo projection image for each of the volume data and the marker data.

The 3D image generator 252 may refresh the existing volume-rendered images of volume data and marker data such that a volume marker selected via the input unit 350 is located at a center of a synthesized rendered image. In this regard, the volume-rendered image of volume data and marker data may be refreshed using known methods, such as a method of using a world matrix or camera matrix.

The synthesized image generator 253 may match the sectional images generated by the 2D image generator 251, i.e., the sectional images taken by slicing the volume data of the object in three directions, and the sectional images taken by slicing the marker data in three directions such that geometric positions thereof correspond to each other and synthesize the images, thereby generating three synthesized sectional images.

The synthesized image generator 253 may match a volume-rendered image of volume data of an object generated by the 3D image generator 252 and a volume-rendered image of marker data such that geometric positions thereof correspond to each other and synthesize the images, thereby generating a synthesized rendered image.

The image correction unit 254 may correct luminance, contrast, color, size, direction or the like of the images generated by the 2D image generator 251, the 3D image generator 252, and the synthesized image generator 253.

When the display unit 650 displays the volume-rendered image, the input unit 350 may be used for an inspector to select whether to display only the synthesized rendered image generated by the synthesized image generator 253 or whether to display the volume-rendered image of the volume data of the object therewith.

The input unit 350 may be used for an inspector to select the volume marker to be located at the center of the synthesized rendered image, within the synthesized sectional images or the synthesized rendered image.

The control unit 450 may output control command signals to the respective 2D image generator 251 and 3D image generator 252 so that 2D sectional images and a 3D rendered image are generated based on the volume data of the object and the marker data.

The storage unit 550 may store an algorithm to generate the sectional images by slicing the volume data of the object and the marker data in three directions, an algorithm to generate the synthesized sectional images, an algorithm to generate the sample sections parallel to the reference section, an algorithm to detect the target site and calculate the center thereof, an algorithm to generate the marker data, an algorithm to generate a projection image or stereo projection image of the volume data of the object and the marker data, or the like.

As illustrated in FIG. 11, the display unit 650 may consist of first, second, third and fourth planes. However, the display unit 650 is different from the display unit 600 illustrated in FIG. 11 in that the synthesized rendered image generated by the synthesized image generator 253 may be output on the fourth plane. In this regard, the synthesized rendered image may be an image acquired through synthesis of projection images or an image acquired through synthesis of stereo projection images according to selection of an inspector.

An inspector may visually check where volume markers are located in the synthesized sectional images or the synthesized rendered image via the display unit 650. An inspector may select a volume marker based on the checked locations of the volume markers.

Synthesized sectional images may be refreshed such that the existing sectional images of each of the volume data and the marker data are refreshed by slicing the volume data and the marker data in three directions based on the selected volume marker and the corresponding sectional images of the volume data and the marker data are synthesized. In addition, a synthesized rendered image may be refreshed by refreshing a volume-rendered image of the volume data and a volume-rendered image of the marker data such that the selected volume marker is located at the center of the synthesized rendered image and synthesizing the volume-rendered images. Volume navigation may be performed by outputting the refreshed images again to the display unit 650.

Figure 13:
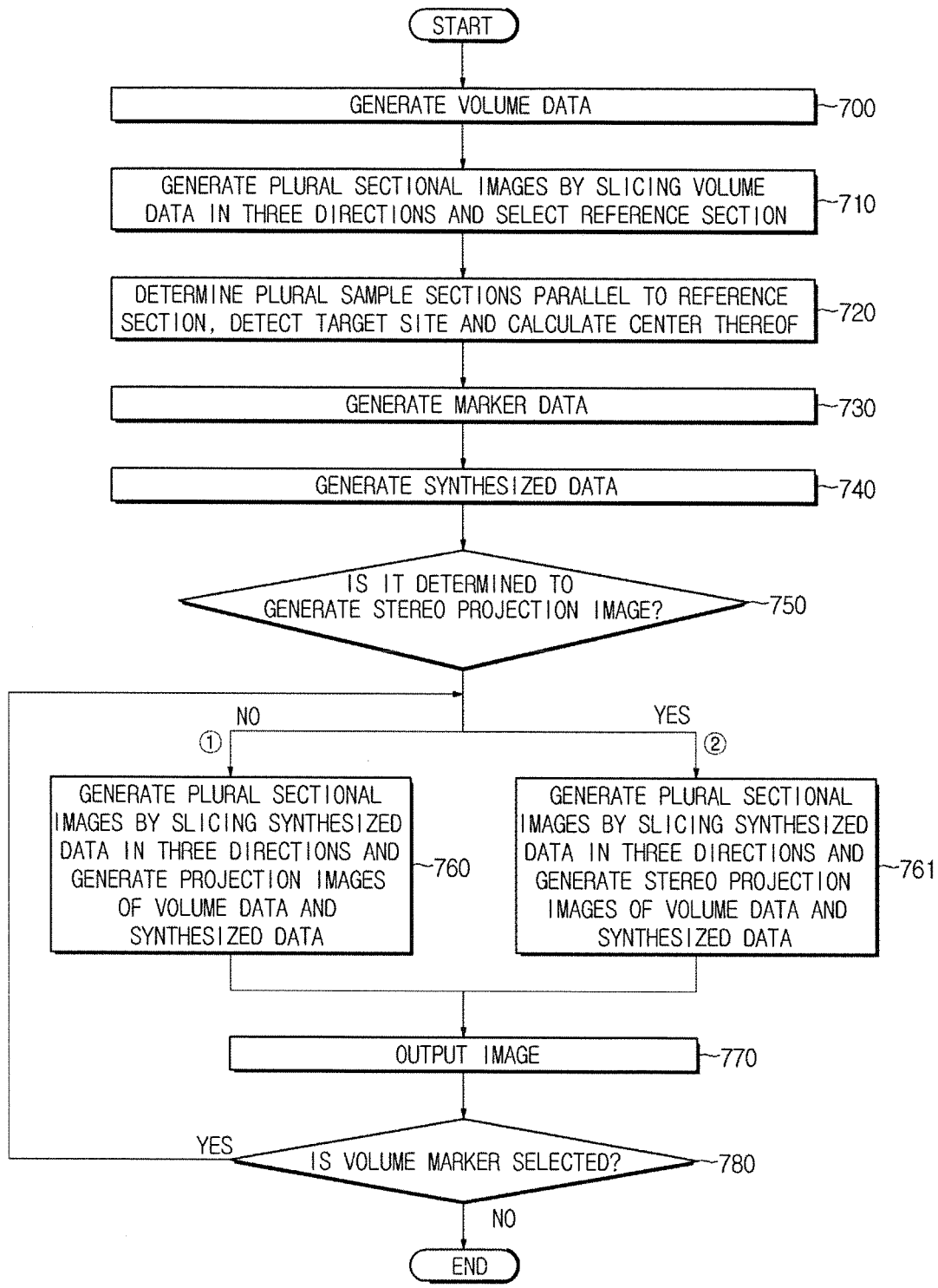
FIG. 13 is a flowchart illustrating a medical imaging apparatus control method according to an embodiment of the present invention.

FIG. 13 is a flowchart illustrating a medical imaging apparatus control method according to an embodiment of the present invention.

Referring to FIG. 13, when a command is instructed to initiate diagnosis of an object, volume data of the object including a target site to be inspected are generated (operation 700).

A plurality of sectional images is generated by slicing the volume data of the object in three directions, and an inspector selects a reference section from the generated sectional images (operation 710). In this regard, the sectional images are perpendicular to one another.

For example, three sectional images may be generated by slicing the volume data of the object in parallel to an X-Z plane (a plane defined by X and Z axes), a Y-Z plane (a plane defined by Y and Z axes), and an X-Y plane (a plane defined by X and Y axes), based on a center of the volume data of the object.

A plurality of sample sections parallel to the reference section are determined within the volume data of the object, the target site is detected from each sample section, and a center thereof is calculated (operation 720). In this regard, a method of detecting the target site and calculating the center thereof is not particularly limited, and any known method may be used.

Marker data are generated such that volume markers are disposed corresponding to the center of each target site (operation 730). A volume marker, which is a 3D marker, has volume and a shape thereof is not limited. When a plurality of volume markers is configured, the volume markers have the same volume and shape. In addition, the volume markers may have different colors, and an inspector may distinguish the volume markers from one another by the colors.

The generated marker data forms a 3D set of voxels and has the same shape as that of the above-described volume data of the object.

Synthesized data are generated by matching geometric positions of the volume data of the object and the marker data in a one-to-one manner and synthesizing the corresponding voxels (operation 740).

Whether to generate a stereo projection image is selected by an inspector (operation 750).

If the inspector determines not to generate a stereo projection image (①), a plurality of sectional images are generated by slicing the synthesized data in three directions, and a projection image is generated by performing volume rendering of the synthesized data (operation 760).

In this regard, the three directions are the same as the directions in which the volume data of the object are sliced in operation 710.

In addition, volume rendering may be performed by perspective projection, and, through perspective projection, a projection image in which perspective is applied to both the target site and the volume marker located at the center of the target site may be generated. Therefore, it is easy for the inspector to identify depth information of the center of the target site and a stereoscopic structure of the target site.

If the inspector determines to generate a stereo projection image (②), a plurality of sectional images is generated by slicing the synthesized data in three directions, and a stereo projection image is generated by performing volume rendering of the synthesized data (operation 761).

Due to generation of the stereo projection image, both the target site and the volume marker located at the center of the target site may be stereoscopically displayed, and thus, it is easy for the inspector to identify depth or direction information of the center of the target site and a stereoscopic structure of the target site.

The sectional images and volume-rendered image of the synthesized data are output on a screen (operation 770). In this regard, the volume-rendered image may be a projection image or a stereo projection image.

The inspector may select a volume marker to be located at the center of the volume-rendered image (operation 780).

The inspector may visually check where volume markers are located in the sectional images or volume-rendered image of the synthesized data. Based on the checked locations of the volume markers, the inspector may select a volume marker.

When the inspector does not select a volume marker, the images are output on a screen and this process is terminated.

When the inspector selects a volume marker, the existing sectional images of the synthesized data are refreshed by slicing the synthesized data in three directions based on the selected volume marker. In addition, the existing volume-rendered image is refreshed such that the selected volume marker is located at the center of the volume-rendered image of the synthesized data. In this regard, the three directions are the same as the existing directions in which the synthesized data are sliced. The volume-rendered image of the synthesized data may be refreshed using known methods. Volume navigation may be performed by outputting the refreshed images again.

Figure 14:
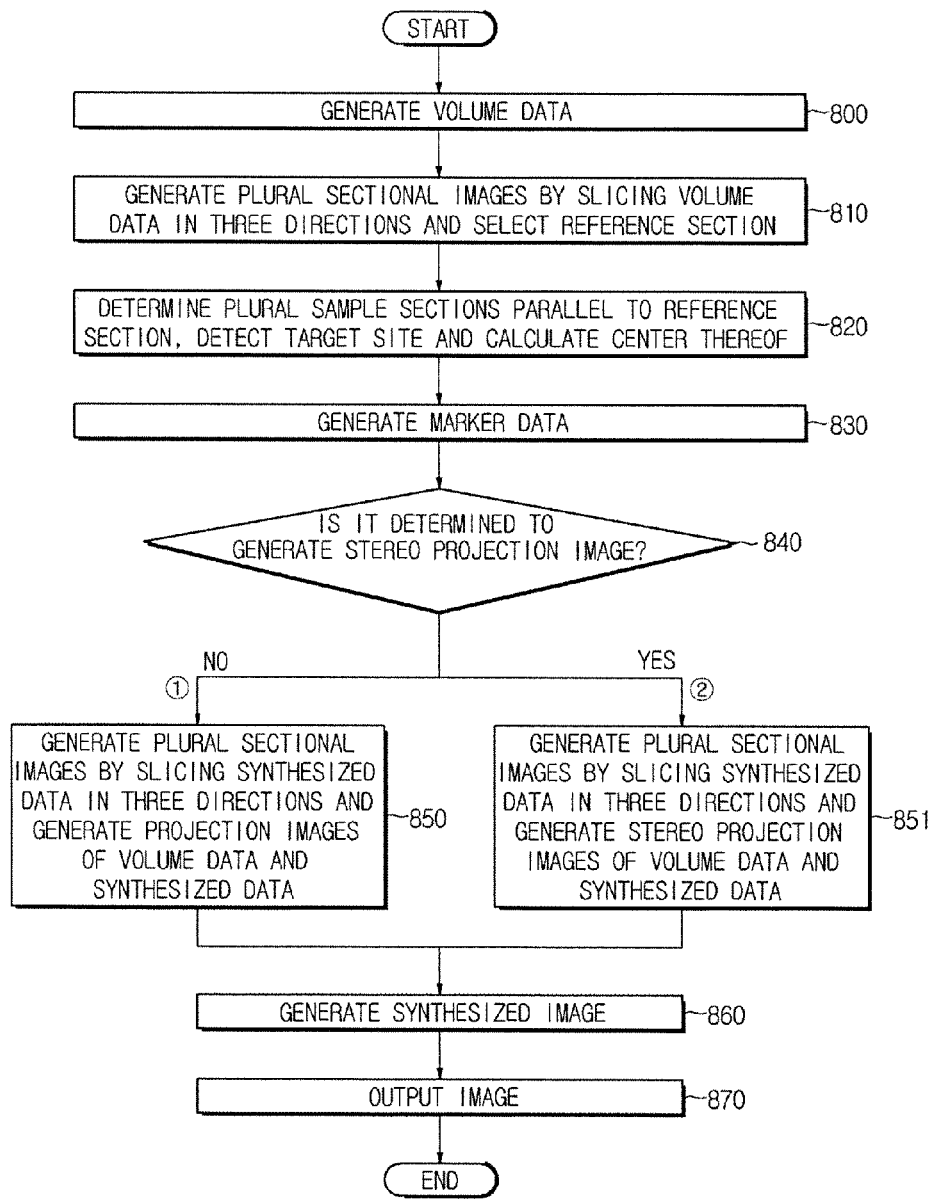
FIG. 14 is a flowchart illustrating a medical imaging apparatus control method according to another embodiment of the present invention.

FIG. 14 is a flowchart illustrating a medical imaging apparatus control method according to another embodiment of the present invention.

In the present embodiment, operations 800, 810, 820 and 830 are the same as operations 700, 710, 720 and 730 illustrated in FIG. 12, and thus, a detailed description thereof will be omitted.

When generation of marker data is completed, information regarding whether to generate a stereo projection image is input according to selection of an inspector (operation 840).

If the inspector determines not to generate a stereo projection image (③), a plurality of sectional images is generated by slicing the marker data in three directions, and a projection image of each of the volume data and the marker data is generated by performing volume rendering of the volume data of the object and the marker data (operation 850).

In this regard, the three directions are the same as the directions in which the volume data of the object are sliced in operation 810.

In addition, volume rendering may be performed by perspective projection, and, through perspective projection, a projection image of the volume data of the object in which perspective is applied to the target site and a projection image of the marker data in which perspective is applied to volume markers may be generated.

If the inspector determines to generate a stereo projection image (④), a plurality of sectional images are generated by slicing the marker data in three directions, and a stereo projection image is generated by performing volume rendering of the volume data of the object and the marker data (operation 851).

That is, a stereo projection image of the volume data of the object in which the target site is stereoscopically displayed and a stereo projection image of the marker data in which volume markers are stereoscopically displayed are generated.

In the sectional images and volume-rendered image of each of the volume data of the object and the marker data, the corresponding images are synthesized to generate synthesized images (operation 860).

In particular, each sectional image of the volume data of the object and each sectional image of the marker data are matched such that geometric positions thereof correspond to each other, thereby generating a plurality of synthesized sectional images.

For example, assuming that three sectional images are generated by slicing the volume data of the object and the marker data in parallel to an X-Z plane (a plane defined by X and Z axes), a Y-Z plane (a plane defined by Y and Z axes), and an X-Y plane (a plane defined by X and Y axes), the corresponding sectional images taken by slicing parallel to the X-Z plane are synthesized, the corresponding sectional images taken by slicing parallel to the X-Z plane are synthesized, and the corresponding sectional images taken by slicing parallel to the X-Y plane are synthesized, thereby generating three synthesized sectional images.

In addition, the volume-rendered image of the volume data of the object and the volume-rendered image of the marker data are matched such that geometric positions thereof correspond to each other, thereby generating a synthesized rendered image. In this regard, the rendered image may be a projection image or a stereo projection image.

The generated synthesized sectional images and synthesized rendered image are output on a screen (operation 870).

Although embodiments of a medical imaging apparatus and a control method therefor have been described with reference to the illustrated drawings, those skilled in the art will appreciate that the invention may be implemented in other particular forms without departing from the spirit and substantive features of the invention. The present embodiments are therefore to be considered in all respects as illustrative and not restrictive.

What is claimed is:

1. A medical imaging apparatus comprising:
   a processor configured
   to generate volume data of an object containing a target site to be inspected,
   to determine a section from among a plurality of 2D sections of the object based on a user input,
   to detect the target site from the volume data of the object and to calculate a center of the target site,
   to generate marker data, wherein the marker data are volume data of a volume marker located at a position corresponding to the center of the target site,
   to generate synthesized data of the determined section by matching geometric positions of the volume data of the object and the marker data in a one-to-one manner and synthesizing corresponding voxels of the volume data and the marker data,
   to extract an image from the synthesized data, and
   to refresh the extracted image such that the volume marker is displayed on a center of a screen the extracted image, based on an additional user input; and
   a display configured to display the refreshed image based on a display mode which is determined from among a plurality of display modes by user input, wherein the plurality of display modes comprise at least one selected from an A-mode in which the intensity of an echo signal is represented by the intensity of amplitude, a B-mode represented by converted brightness or luminance, an M-mode in which a distance between the medical imaging apparatus and a moving target site is represented by temporal changes, a D-mode using pulse waves or continuous waves, and a CFM-mode represented as a color image using the Doppler effect.

2. The medical imaging apparatus according to claim 1, wherein the volume marker comprises at least one volume marker.

3. The medical imaging apparatus according to claim 2, wherein the volume marker comprises a plurality of volume markers, the volume markers having the same volume and shape.

4. The medical imaging apparatus according to claim 2, wherein the volume marker comprises a plurality of volume markers, the volume markers having different colors.

5. The medical imaging apparatus according to claim 1, wherein:
   the processor generates a plurality of sample sections parallel to the determined section within the volume data of the object, detects the target site from each of the plurality of sample sections, and calculates a center of each target site.

6. The medical imaging apparatus according to claim 1, wherein the processor generates a rendered image in which perspective is applied to the volume marker.

7. The medical imaging apparatus according to claim 1, wherein the processor generates a plurality of projection images through rendering of the synthesized data from a plurality of viewpoints and generates a stereo projection image by composing the projection images, and
   wherein the extracted image comprises the stereo projection image.

8. The medical imaging apparatus according to claim 1, wherein:
   the processor generates a rendered image of the volume data of the object; and
   the display displays both the generated rendered image of the volume data of the object and the generated rendered image of the synthesized data.

9. The medical imaging apparatus according to claim 1, wherein the plurality of 2D sections are perpendicular to one another.

10. A method of controlling a medical imaging apparatus, the method comprising:
    generating volume data of an object containing a target site to be inspected;
    determining a section from among a plurality of 2D sections of the object based on a user input;
    detecting the target site from the volume data of the object and calculating a center of the target site;
    generating marker data, wherein the marker data are volume data of a volume marker located at a position corresponding to the center of the target site;
    generating synthesized data of the determined section by matching geometric positions of the volume data of the object and the marker data in a one-to-one manner and synthesizing corresponding voxels of the volume data and the marker data;
    refreshing the extracted image such that the volume marker is displayed on a center of a screen the extracted image, based on an additional user input; and
    displaying the refreshed image based on a display mode which is determined from among a plurality of display modes by user input, wherein the plurality of display modes comprise at least one selected from an A-mode in which the intensity of an echo signal is represented by the intensity of amplitude, a B-mode represented by converted brightness or luminance, an M-mode in which a distance between the medical imaging apparatus and a moving target site is represented by temporal changes, a D-mode using pulse waves or continuous waves, and a CFM-mode represented as a color image using the Doppler effect.

11. The method according to claim 10, wherein the volume marker comprises at least one volume marker.

12. The method according to claim 11, wherein the volume marker comprises a plurality of volume markers, the volume markers having the same volume and shape.

13. The method according to claim 11, wherein the volume marker comprises a plurality of volume markers, the volume markers having different colors.

14. The method according to claim 10, further comprising:
generating a plurality of sample sections parallel to the determined section within the volume data of the object,
wherein the detecting comprises detecting the target site from each of the plurality of sectional images and calculating a center of each target site.

15. The method according to claim 10, wherein the generating the synthesized data comprises generating a rendered image in which perspective is applied to the volume marker.

16. The method according to claim 10, wherein the generating of the synthesized data comprises generating a plurality of projection images through rendering of the synthesized data from a plurality of viewpoints and generating a stereo projection image by composing the projection images, and
wherein the extracted image comprises the stereo projection image.

17. The method according to claim 10, wherein the displaying the refreshed image comprises:
generating of the rendered image of the synthesized data comprises generating a rendered image of each of the volume data of the object and the synthesized data, and the displaying comprises displaying both the generated rendered image of the volume data of the object and the generated rendered image of the synthesized data.

18. The method according to claim 10, wherein the plurality of 2D sections are perpendicular to one another.

* * * * *